Oct. 25, 1932. H. I. KOPPELMAN ET AL  1,884,750

DISPENSING VALVE

Filed May 21, 1931

Inventors:
Harold I. Koppelman
and Bruno W. Seidel,
By Munning & Munning
Attys.

Patented Oct. 25, 1932

1,884,750

UNITED STATES PATENT OFFICE

HAROLD I. KOPPELMAN AND BRUNO W. SEIDEL, OF CHICAGO, ILLINOIS, ASSIGNORS TO U. S. SANITARY SPECIALTIES CORPORATION, OF CHICAGO, ILLINOIS, A CORPORATION OF ILLINOIS

DISPENSING VALVE

Application filed May 21, 1931. Serial No. 538,970.

This invention relates to liquid dispensing valves and particularly valves for dispensing liquid soap from a constant supply source.

One of the objects is to provide an adjustable check valve whereby the amount of soap to be dispensed may be definitely measured.

Another object is to provide a structure attachable to a supply line and removable in part therefrom, withal preventing escape of fluid therefrom.

Another object is to provide a double closing valve at the outlet port so as to prevent any dripping when not in use.

A further object is to so construct and arrange the valve parts as to adapt the dispenser for use on a pressure system by preventing direct communication between the supply source and the discharge opening regardless of the positions which the parts may occupy in operation.

A suggestive embodiment of my invention is set forth in the accompanying drawing, in which—

Figures 1, 2, 3, 4:
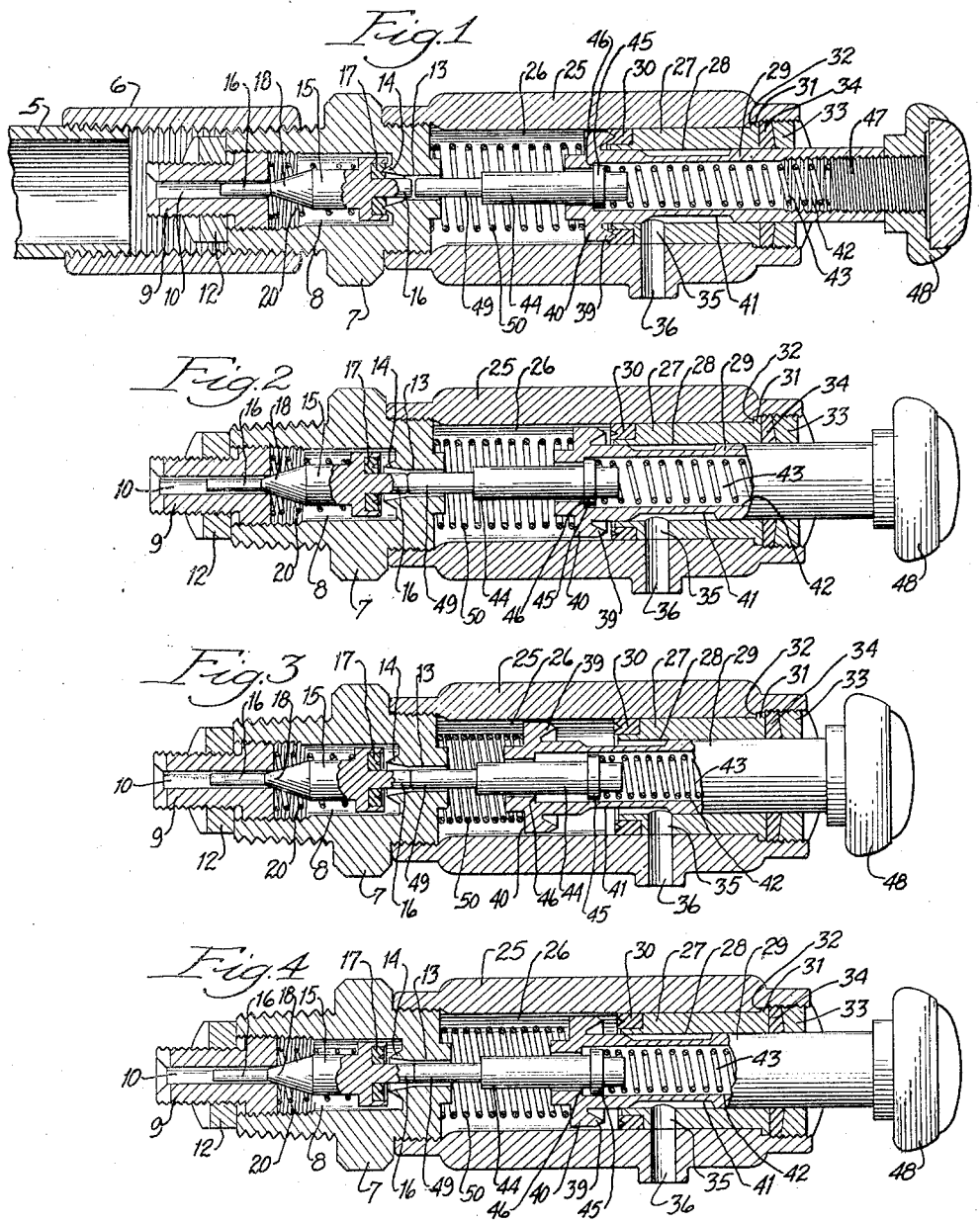
Figure 1 is a longitudinal sectional elevation of the valve showing the operating parts in normal position.
Fig. 2 is a similar view showing the position of the parts when the plunger is moved forward to close the inlet valve.
Fig. 3 is a similar view showing the plunger moved forward to open the outlet port.
Fig. 4 is a similar view showing the plunger returned to the point where the outlet port is just being closed and the inlet port not yet opened.

Referring to Fig. 1 wherein is shown my improved valve attached to and supported by a pipe line 5 having a threaded collar 6 connected to a nipple 7. The nipple is provided with a central bore 8 one end of which is threaded to receive the threads of a bushing 9 having a central opening 10, hereafter referred to as an inlet port. The bushing may have a lock nut 12 in threaded connection therewith for locking the bushing in a predetermined adjusted position. The other end of the bore 8 terminates in a reduced opening 13 having an annular valve seat 14 surrounding the opening and extending into the bore 8.

A valve unit 15 is placed in the bore 8, the same having guide pins 16 at each end which lie in the inlet port and opening 13. The valve unit comprises a check valve 17 at one end adapted to contact with the seat 14, and a conical portion at the other end forming an inlet valve 18 which closes the inlet port when the valve unit is moved in the direction of the bushing. The valve unit is normally held in a position to close the check valve by a spring 20 interposed between the bushing and a shoulder on the valve unit.

A body 25 having a chamber 26 is secured to the nipple by threaded connection so that it may be readily removed for cleaning or repairing. Fitted in the outer end of the chamber is a bearing 27 having a central bore 28 in which is slidably fitted a plunger 29. The bearing is provided at its inner end with an annular valve seat 30 and at its opposite end an enlargement 31 for abutting a shoulder 32 formed in the body. The bearing is held in position in the chamber by a gland 33 having suitable packing 34 interposed therebetween which bears against the plunger to form a seal. The bearing is provided with a radial opening 35 in alignment with an outlet port 36, in the body, from which the liquid is dispensed.

The plunger is provided with a pump head 40, which is smaller in diameter than the chamber, permitting the liquid to pass therebetween. Extending rearwardly from the pump head is a valve flange 39 which bears against the valve seat 30 when in normal position. An annular groove 41 is cut in the plunger to provide a passage for the liquid from the chamber to the outlet port when the plunger has been moved to the position shown in Fig. 3. The plunger has a central bore 42 in which is placed a spring 43 and a stem 44, the latter being provided with a head 45 adapted to abut a shoulder 46 in the plunger and held thereagainst by the spring 43 when the parts are in normal position. The bore is closed at its outer end by a threaded plug 47 which extends therefrom to receive a button 48 by which the plunger is operated.

The stem 44 extends outwardly from the plunger and terminates in a pin 49 of reduced diameter which lies in the opening 13 adjacent the guide pin 16. The spring 43 is placed under tension with one end bearing against the head of the stem and its opposite end against the plug so that the stem is urged forward thereby. It should be understood that the spring 43 is of greater strength than the spring 20, the latter being compressed as the plunger is pushed forward against a spring 50 until the inlet port is closed, whereupon the spring 43 is compressed as shown in Fig. 3.

The valve is operated in the following manner: The plunger is moved forward against the spring 50 carrying with it the stem, the pin of which contacts with the guide pin of the valve unit, first, to open the check valve permitting a predetermined amount of liquid to pass into the chamber, and, second, to close the inlet valve as shown in Fig. 2. During this movement the valve flange 39 is unseated but the liquid in the chamber cannot be dispensed through the outlet port because the bore 28 in the bearing is closed by the plunger. Further movement of the plunger, as shown in Fig. 3, places the annular groove in a position so that liquid may pass along the plunger to the outlet. The pump head during this movement is compressing the liquid to force it past the head in the chamber so that on the return stroke the head forces some of that liquid through the outlet. Fig. 4 illustrates the position of the plunger at the point where the plunger closes the passage between the chamber and the outlet. As the plunger moves from this position to that shown in Fig. 1, the inlet valve is opened permitting the liquid to fill the chamber whereupon the check valve is seated to prevent excess pressure of the liquid to cause leaks, and, finally, the valve flange is seated to positively close the passage to the outlet port.

The present valve is advantageous in that at no time during the operation is there a direct communication between the supply line and the outlet which would permit a direct flow of liquid therefrom. A further advantage is that the check valve remains closed when not being operated thus permitting the removal of the packing gland or the entire body without first having to close a valve and drain the entire line as would be the case were a central tank used for a multiplicity of dispensing valves.

We claim:

1. In a liquid dispenser, the combination of a supply pipe, a body having a chamber and an outlet port, a plunger movable within the chamber to open and close the outlet port, a nipple having a central bore and a restricted opening at one end thereof, a bushing having an inlet port adjustably connected to the nipple in the end opposite the restricted opening, a valve unit mounted in the bore of the nipple and adapted to close either the restricted opening or the inlet port, and means on the plunger for moving the valve unit to close the inlet port before the plunger opens the outlet port.

2. In a liquid dispenser, the combination of a supply pipe, a body having a chamber and an outlet port, a plunger movable within the chamber to open and close the outlet port, a nipple having a central bore and a restricted opening at one end thereof, a bushing having an inlet port adjustably connected to the nipple in the end opposite the restricted opening, a valve unit mounted in the bore of the nipple and adapted to close either the restricted opening or the inlet port, means on the valve unit for guiding the same axially within the nipple, and means on the plunger for moving the valve unit to close the inlet port before the plunger opens the outlet port.

3. In a liquid dispenser, the combination of a supply pipe, a body having a chamber and an outlet port, a plunger movable within the chamber to open and close the outlet port, a nipple having a central bore and a restricted opening at one end thereof, a bushing having an inlet port adjustably connected to the nipple in the end opposite the restricted opening, a valve unit mounted in the bore of the nipple and adapted to close either the restricted opening or the inlet port, and spring pressed means on the plunger for moving the valve unit to close the inlet port before the plunger opens the outlet port.

4. In combination with a supply pipe, a body having a chamber and an outlet port, a nipple connecting the supply pipe to the body, the nipple having an inlet port and a check valve seat, a valve unit in the nipple adapted to normally close the check valve, a plunger having a groove slidably fitted within the body to normally close the outlet port, and a spring pressed pin extending from the plunger and adapted to move the valve unit to open the check valve and close the inlet valve when the plunger is advanced into the chamber, the valve unit closing the inlet valve before the groove on the plunger is moved to a position providing a passage between the chamber and the outlet port.

5. A liquid dispensing device comprising a body having a chamber and an outlet port, a nipple attached to one end thereof and having an inlet port and restricted opening, a plunger having a stem operable within the chamber to eject liquid through the outlet port, the plunger having an annular groove arranged to open the outlet port during part of the ejecting movement of the plunger, a valve unit within the nipple having a check valve for normally closing the restricted opening and an inlet valve for seating in the inlet port, the valve unit being operable by the stem whereby the check valve is opened to admit a predetermined amount of liquid to enter the chamber whereupon the inlet valve is closed during part of the advancing and returning movement of the plunger.

6. A liquid dispenser comprising a body having a chamber and an outlet port, a nipple having a central bore and a restricted opening in threaded connection with one end of the chamber, a bearing having a central bore and a radial opening in alignment with the outlet port in the other end of the chamber, a valve seat on the inner end of the bearing, a plunger having an annular groove therein slidably fitted in the bore of the bearing, a pump head on the plunger of less diameter than the chamber, a valve flange projecting from the pump head and adapted to contact with the valve seat when the plunger is in normal position, a bushing having an inlet port adjustably fitted in the bore of the nipple, a valve unit in the nipple normally closing the restricted opening, and retractable means on the plunger for moving the valve unit to uncover the restricted opening and close the inlet port while the valve on the pump head is unseated and before the groove on the plunger connects the chamber with the outlet port whereby liquid from the chamber is discharged therefrom.

7. In a liquid dispenser, the combination with a supply pipe of a body connected therewith having a discharge port and provided with two port-connected chambers one in communication with the discharge port and the other equipped with an inlet port, a plunger movable within one chamber to open and close the discharge port, a valve unit movable within the other chamber to close either the inlet port or the connecting port, and means associated with the plunger for moving the valve unit to close the inlet port before the plunger opens the discharge port.

8. In a liquid dispenser, the combination with a supply pipe of a body connected therewith having a chamber and a discharge port, a plunger movable within the chamber to open and close the discharge port, a second body within the first having a central bore communicating with inlet and outlet ports at opposite ends thereof, a valve unit mounted in the bore of the second body and adapted to close either the inlet or outlet ports, and means on the plunger for moving the valve unit to close the inlet port before the plunger opens the discharge port.

HAROLD I. KOPPELMAN.
BRUNO W. SEIDEL.